Aug. 16, 1927.
G. A. VON SODEN-FRAUNHOFEN
1,639,174
CHANGE SPEED GEAR
Original Filed June 28, 1920
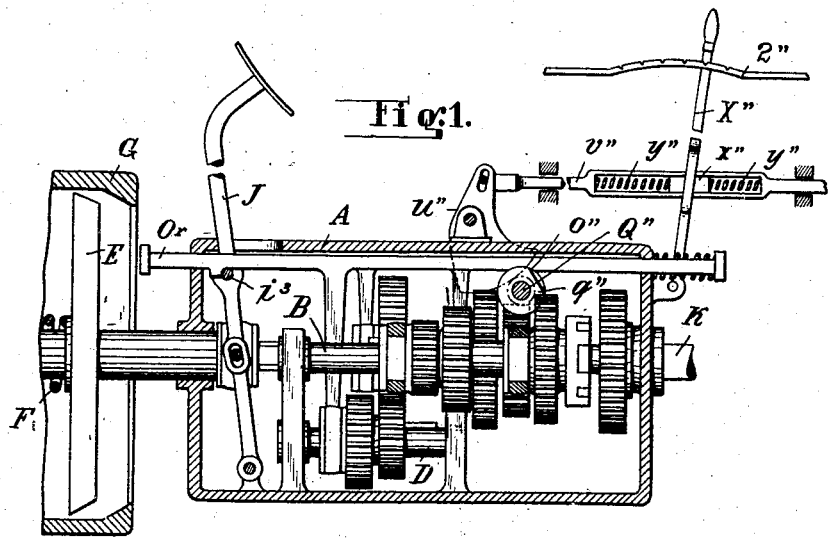
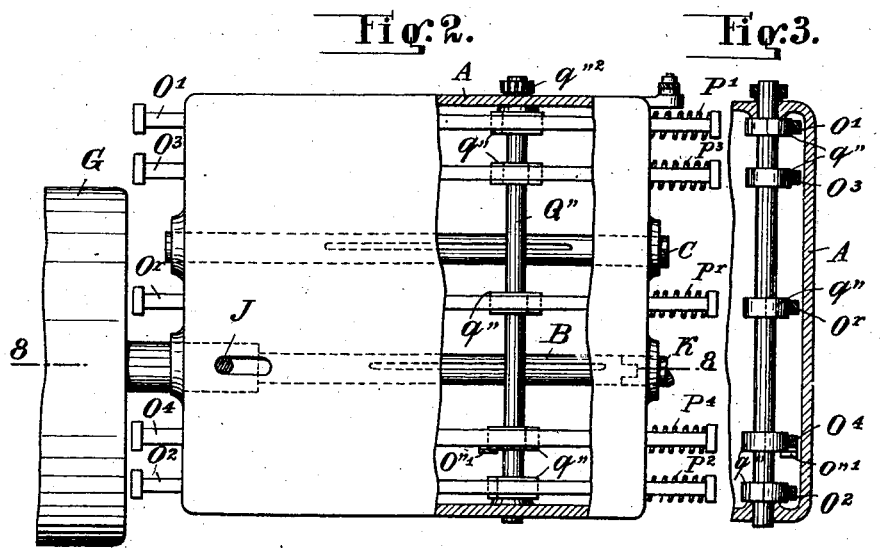
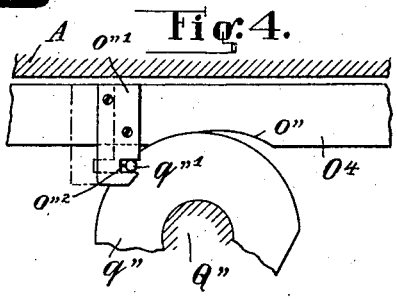
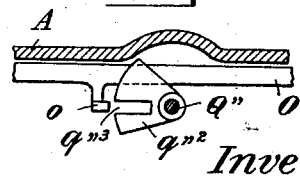
Inventor
Graf Alfred v. Soden-Fraunhofen
by O V Killichau
Attorney.

Patented Aug. 16, 1927.

1,639,174

UNITED STATES PATENT OFFICE.

GRAF ALFRED von SODEN-FRAUNHOFEN, OF FRIEDRICHSHAFEN, GERMANY, ASSIGNOR, BY MESNE ASSIGNMENTS, TO THE FIRM: ZAHNRADFABRIK AKTIENGESELLSCHAFT, OF FRIEDRICHSHAFEN, GERMANY.

CHANGE-SPEED GEAR.

Original application filed June 28, 1920, Serial No. 392,444, and in Germany September 13, 1916. Divided and this application filed January 25, 1922. Serial No. 531,811.

My invention relates to change speed gear for motor cars and more particularly to toothed sliding gear of the kind in which striker rods are employed for throwing the change wheels in and out of gear.

In the forms of gear of this type hitherto used the operation of securing, and of releasing the striker rods is made dependent upon the control lever by the actuation of which the said rods are caused to be moved. If it be desired to change over from one speed to another, be this a speed of any kind whatsoever, by suitably actuating the control lever the change wheels forming the set momentarily in engagement are thrown out of engagement in quick succession, the striker rod appertaining thereto is locked, while the rod provided for putting in the new speed is released, and the corresponding set or pair of change wheels is brought into engagement.

Now a control arrangement of this kind involves various drawbacks. For one thing, the control lever must be successively moved in various directions, and this in the case of the well known gate type of gear control, for example, not only in the sense of a rotation about an axis, but also in that of a displacement along this same axis. It thus requires a good deal of experience in order to be able to always reliably execute the proper movements for putting in any desired speed, and this with the rapidity frequently required in such contingencies in the case of motor cars. A further drawback resides in the fact that even assuming the most thorough knowledge of the existing road conditions on the part of the driver, and that thus he will exactly know what rate of speed he must put in next, there will be no way of preparing this latter operation in advance.

My present invention purposes to overcome the aforesaid drawbacks, and to produce a change gear, which, while embodying great reliability of service and plainness of construction, excels by the feature of not only the control action proper being simplified, but also by offering the possibility of enabling the operation of putting in the next following speed required to be prepared in advance. The subject matter of this invention thus relates to a toothed change gear in the case of which the disconnection of the particular striker rod to be thrown into action for the time being, is effected independently of the control lever by the manipulation of which the striker rods are moved.

This application is a division of my copending application Serial Number 392,444.

In the drawings affixed to this specification and forming part thereof, a device embodying my invention is illustrated diagrammatically by way of example. In the drawings—

Figs. 1 to 3 are a vertical longitudinal section, a plan view, partly in section and a cross section, Figs. 4 and 5 are details, drawn to a larger scale.

Referring to the drawings each of the striker rods $O^r$ to $O^4$ of the change speed gear shown in Fig. 1 is provided with a circular groove $o''$, in which one each of a series of discs $q''$, fixed on a lock shaft $Q''$, is enabled to loosely engage, provided the respective striker rod happens to be in the forward position.

From each of said five discs $q''$, there is cut out a segment appertaining to an angle of 60°. Now these discs are so staggered relatively to each other, that the five cutting faces come to constitute the sides of a regular hexagonal prism. For the rest, the conditions selected are such that in the case of each of the five discs, the cutting surface, on it being completely turned upward, will extend immediately underneath the lower edge of the respective striker rod. This latter may then, on the one hand, glide without impediment from the front inactive, into its rear active position, on the other hand, it will prevent, as long as it has not again been drawn by the lever J into the forward inoperative position, any rotation on the part of shaft $Q''$. This latter is connected at its one end by a toothed wheel $q''^2$ with the lever $U''$ of a toothed segment disposed at the gear box A. Said lever $U''$ obtains its motion from a transmission rod $V''$, the central portion of which is shaped to form a sliding frame for a block $x''$, positively connected with the control lever $X''$. Two springs $Y''$, of preferably the like strength, are arranged at either side of said block within the sliding frame and tend to maintain said frame in its central position relatively to the block. The control lever X″ may be adjusted, on a guide bar 2″, into a position corresponding to the speed required for the time being.

During the runninglight action, all the striker rods are in the forward position in which they are held locked (Fig. 2), and in which they embrace the remaining portions of discs $q''$ by means of their grooves. In order that no arbitrary rotation of the shaft Q″ can take place, which might possibly enable one of the striker rods to clear the way, and enable one of the wheel sets to be thrown into gear, an arrangement is provided which is shown in detail in Fig. 4, and which consists of the following: One of the striker rods, say, for example, $O^4$ is provided close in front of its groove $o''$ with a lateral plate $o''^1$, having a rearwardly inclined slot $o''^2$. The disc $q''$ appertaining to this rod is fitted out with a bolt $q''^1$, disposed in the path of slot $o''^2$ on the shaft Q″ being set to running light. When the pedal J, and therewith the striker rod $O^4$, assume their forward position, the plate $o''^1$ will be beyond reach of the bolt $q''^1$, as shown in dash and dot lines in the drawing. On the pedal being now released, the rod $O^4$ returns for a safety distance into its inoperative position, in which it bears up against the disc $q''$ by means of the front portion of its groove $o''$. As disclosed by Fig. 4 the bolt $q''^1$ will then be disposed within the slot $o''^2$, so that any liability of shaft Q″ effecting any rotation is rendered entirely impossible.

The striker rods and the shaft Q″ may moreover be mutually locked without it proving necessary to weaken the said rods by providing them with grooves. In the form of construction shown in Fig. 5, for example, each of the striker rods O is fitted out with a dependent extension having a lateral sliding member $o$. On the same planes in which these sliding members are disposed, there is arranged on the shaft Q″ one each of a number of discs $q''^2$ having slots $q''^3$ corresponding in size to the extent of the displacement effected by the striker rods. It thus follows, that on the shaft Q″ having been suitably adjusted, and after the pedal has been released, one of the striker rods may always freely shift to the rear and put in the speed required. The advantage of this arrangement over and above that shown in Figs. 1 to 4, consists in the fact of the angle of rotation of the shaft Q″, when changing over from one speed to another, being relatively small, since the rotation along the periphery of the disc need only correspond to the breadth of the slot. For the rest, the shaft Q″ may also be actuated by a cable train or an electrical long-distance control arrangement, even as, on the other hand, each of the lock bars may be displaced in its position by a long-distance control device by aid of control rods.

I wish it to be understood that I do not desire to be limited to the exact details of construction shown and described, for obvious modifications will occur to a person skilled in the art.

I claim:

In a change speed gear in combination, a plurality of change speed wheels, striker rods, adapted to cooperate with said wheels, means for throwing the said striker rods in and out, respectively, a circular groove in each striker rod, a lock shaft extending across all said striker rods and discs on said shaft, each adapted to engage with the groove in a striker rod and separate means for operating said rotary means.

In testimony whereof I affix my signature.

GRAF ALFRED v. SODEN-FRAUNHOFEN.